(12) United States Patent
Rajappa et al.

(10) Patent No.: US 10,289,183 B2
(45) Date of Patent: May 14, 2019

(54) METHODS AND APPARATUS TO MANAGE JOBS THAT CAN AND CANNOT BE SUSPENDED WHEN THERE IS A CHANGE IN POWER ALLOCATION TO A DISTRIBUTED COMPUTER SYSTEM

(71) Applicant: Intel Corporation, Santa Clara, CA (US)

(72) Inventors: Muralidhar Rajappa, Chandler, AZ (US); Andy Hoffman, Olympia, WA (US); Devadatta Bodas, Federal Way, WA (US); Justin Song, Olympia, WA (US); James Alexander, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/582,772

(22) Filed: Dec. 24, 2014

(65) Prior Publication Data

US 2016/0054781 A1 Feb. 25, 2016

Related U.S. Application Data

(60) Provisional application No. 62/040,576, filed on Aug. 22, 2014.

(51) Int. Cl.
*G06F 1/32* (2019.01)
*H04L 12/24* (2006.01)
(Continued)

(52) U.S. Cl.
CPC .......... *G06F 1/3203* (2013.01); *G05B 15/02* (2013.01); *G06F 1/30* (2013.01); *G06F 1/329* (2013.01);
(Continued)

(58) Field of Classification Search
None
See application file for complete search history.

(56) References Cited

U.S. PATENT DOCUMENTS

| | | | |
|---|---|---|---|
| 5,388,265 A | 2/1995 | Volk | |
| 5,598,537 A | 1/1997 | Swanstrom et al. | |

(Continued)

FOREIGN PATENT DOCUMENTS

| | | |
|---|---|---|
| WO | WO-2002/019078 | 3/2002 |
| WO | WO-2004/070619 | 8/2004 |

(Continued)

OTHER PUBLICATIONS

PCT International Search Report and Written Opinion of the International Searching Authority for Int'l Application No. PCT/US2015/036403, dated Sep. 4, 2015 (14 pages).

(Continued)

*Primary Examiner* — Wynuel S Aquino
(74) *Attorney, Agent, or Firm* — Womble Bond Dickinson (US) LLP (57) ABSTRACT

A non-transitory computer readable storage medium storing instructions executable by one or more processors of a distributed computer system to perform operations including determining whether a power consumed by the distributed computer system is greater than a power allocated to the distributed computer system, responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system and responsive to determining all jobs being processed by the distributed computer system are processing at a lowest power state for each job, sus- (Continued)

pending a job having a lowest priority among all jobs being processed by the distributed computer system is shown.

14 Claims, 6 Drawing Sheets

(51) Int. Cl.
| | | |
|---|---|---|
| G05B 15/02 | (2006.01) | |
| G06F 1/30 | (2006.01) | |
| G06Q 50/06 | (2012.01) | |
| G06F 9/48 | (2006.01) | |
| H04L 12/911 | (2013.01) | |
| G06F 9/50 | (2006.01) | |
| H04L 12/26 | (2006.01) | |
| G06F 1/3203 | (2019.01) | |
| G06F 1/3234 | (2019.01) | |
| G06F 1/329 | (2019.01) | |
| G06F 1/3209 | (2019.01) | |
| G06F 1/3296 | (2019.01) | |
| G06F 1/3228 | (2019.01) | |

(52) U.S. Cl.
CPC .......... *G06F 1/3209* (2013.01); *G06F 1/3228* (2013.01); *G06F 1/3234* (2013.01); *G06F 1/3296* (2013.01); *G06F 9/4881* (2013.01); *G06F 9/4893* (2013.01); *G06F 9/5094* (2013.01); *G06Q 50/06* (2013.01); *H04L 41/0833* (2013.01); *H04L 43/08* (2013.01); *H04L 47/783* (2013.01); *H04L 47/821* (2013.01); *Y02D 10/22* (2018.01); *Y04S 40/162* (2013.01); *Y04S 40/168* (2013.01)

(56) References Cited

U.S. PATENT DOCUMENTS

| | | | |
|---|---|---|---|
| 5,752,050 | A | 5/1998 | Hernandez et al. |
| 5,784,628 | A | 7/1998 | Reneris |
| 5,842,027 | A | 11/1998 | Oprescu et al. |
| 5,905,900 | A | 5/1999 | Combs et al. |
| 6,125,450 | A | 9/2000 | Kardach |
| 6,745,335 | B1 | 6/2004 | Kusano |
| 6,760,852 | B1 | 7/2004 | Gulick |
| 6,971,033 | B2 | 11/2005 | Ma |
| 7,028,200 | B2 | 4/2006 | Ma |
| 7,111,179 | B1 | 9/2006 | Girson et al. |
| 7,143,300 | B2 | 11/2006 | Potter et al. |
| 7,861,068 | B2 | 12/2010 | Gorbatov et al. |
| 8,001,403 | B2 | 8/2011 | Hamilton et al. |
| 8,060,762 | B2 | 11/2011 | Banginwar et al. |
| 8,336,056 | B1 | 12/2012 | Gadir et al. |
| 2002/0194251 | A1 | 12/2002 | Richter et al. |
| 2003/0041272 | A1 | 2/2003 | Nguyen |
| 2003/0126240 | A1 | 7/2003 | Vosseler |
| 2003/0163745 | A1 | 8/2003 | Kardach |
| 2003/0221026 | A1 | 11/2003 | Newman |
| 2004/0022225 | A1 | 2/2004 | Liang et al. |
| 2004/0025063 | A1 | 2/2004 | Riley |
| 2005/0113103 | A1 | 5/2005 | Snowden et al. |
| 2005/0136961 | A1 | 6/2005 | Simonsson et al. |
| 2005/0138438 | A1 | 6/2005 | Bodas |
| 2005/0154789 | A1* | 7/2005 | Fellenstein ............... G06F 9/50 709/223 |
| 2005/0273633 | A1 | 12/2005 | Wilcox et al. |
| 2007/0220293 | A1 | 9/2007 | Takase |
| 2007/0240160 | A1 | 10/2007 | Paterson-Jones |
| 2007/0245161 | A1 | 10/2007 | Shaw et al. |
| 2008/0104428 | A1 | 5/2008 | Naffziger et al. |
| 2008/0178019 | A1 | 7/2008 | McGrane et al. |
| 2008/0209243 | A1 | 8/2008 | Ghiasi et al. |
| 2008/0222434 | A1 | 9/2008 | Shimizu et al. |
| 2008/0301475 | A1 | 12/2008 | Felter et al. |
| 2009/0049313 | A1 | 2/2009 | Gooding et al. |
| 2009/0083746 | A1 | 3/2009 | Katsumata et al. |
| 2009/0113221 | A1 | 4/2009 | Holle et al. |
| 2009/0138219 | A1 | 5/2009 | Bletsch et al. |
| 2009/0254660 | A1 | 10/2009 | Hanson et al. |
| 2009/0265568 | A1 | 10/2009 | Jackson |
| 2009/0271046 | A1 | 10/2009 | Lewis et al. |
| 2010/0106985 | A1 | 4/2010 | Panguluri et al. |
| 2010/0205469 | A1 | 8/2010 | McCarthy et al. |
| 2010/0235840 | A1 | 9/2010 | Angaluri |
| 2010/0257531 | A1 | 10/2010 | Barsness et al. |
| 2010/0313203 | A1* | 12/2010 | Dawson ............... G06F 1/3203 718/102 |
| 2011/0022857 | A1 | 1/2011 | Nussbaum et al. |
| 2011/0022868 | A1 | 1/2011 | Harchol-Balter et al. |
| 2011/0161696 | A1 | 6/2011 | Fletcher |
| 2011/0167425 | A1 | 7/2011 | Lurie et al. |
| 2011/0178652 | A1 | 7/2011 | Carter et al. |
| 2011/0271283 | A1* | 11/2011 | Bell, Jr. ................ G06F 9/5094 718/102 |
| 2012/0005683 | A1 | 1/2012 | Bower, III et al. |
| 2012/0054512 | A1 | 3/2012 | Archibald et al. |
| 2012/0060170 | A1 | 3/2012 | Vajda et al. |
| 2012/0072745 | A1 | 3/2012 | Ahluwalia et al. |
| 2012/0084580 | A1 | 4/2012 | Harchol-Balter et al. |
| 2012/0165963 | A1 | 6/2012 | Kim et al. |
| 2012/0216205 | A1 | 8/2012 | Bell, Jr. et al. |
| 2012/0324264 | A1 | 12/2012 | Hanson et al. |
| 2013/0103968 | A1 | 4/2013 | Conroy et al. |
| 2013/0124885 | A1 | 5/2013 | Davis et al. |
| 2013/0139172 | A1 | 5/2013 | An et al. |
| 2013/0185576 | A1 | 7/2013 | Brundridge et al. |
| 2013/0212410 | A1 | 8/2013 | Li et al. |
| 2013/0227557 | A1 | 8/2013 | Pechanec et al. |
| 2013/0339776 | A1 | 12/2013 | Jagadishprasad et al. |
| 2014/0006534 | A1 | 1/2014 | Jain et al. |
| 2014/0059556 | A1 | 2/2014 | Barsness et al. |
| 2014/0075222 | A1 | 3/2014 | Jackson |
| 2014/0075448 | A1 | 3/2014 | Bell, Jr. et al. |
| 2014/0114107 | A1 | 4/2014 | Gami |
| 2014/0137121 | A1 | 5/2014 | Asakura et al. |
| 2014/0149768 | A1 | 5/2014 | Kansal et al. |
| 2014/0214107 | A1 | 7/2014 | Gandhi et al. |
| 2014/0245054 | A1 | 8/2014 | Hamdi et al. |
| 2014/0282425 | A1 | 9/2014 | Zhao et al. |
| 2014/0317635 | A1 | 10/2014 | Konno et al. |
| 2015/0067693 | A1* | 3/2015 | Yamazaki ............ G06F 9/4893 718/103 |
| 2015/0169026 | A1 | 6/2015 | Bodas et al. |
| 2015/0177814 | A1 | 6/2015 | Bailey et al. |
| 2015/0248312 | A1 | 9/2015 | Brochard et al. |
| 2016/0011914 | A1 | 1/2016 | Bohn |

FOREIGN PATENT DOCUMENTS

| | | |
|---|---|---|
| WO | WO-2006/007146 | 1/2006 |
| WO | WO-2013/172816 | 11/2013 |
| WO | 2014/053610 A1 | 4/2014 |

OTHER PUBLICATIONS

Alvarruiz, F., de Alfonso, C., Caballer, M. and Hernández, V. 2012. An Energy Manager for High Performance Computer Clusters. ISPA '12 Proceedings of the 2012 IEEE 10th International Symposium on Parallel and Distributed Processing with Applications.
Bhattacharya, A. 2013. Constraints and Techniques for Software Power Management in Production Clusters. Technical Report No. UCB/EECS-2013-110, Electrical Engineering and Computer Sciences, University of California at Berkeley. http://www.eecs.berkeley.ed.
Brehm, M. 2013. Energy Aware Scheduling SuperMUC@ LRZ. Application Support Group. Leibniz Supercomputing Centre. http://www.autotune-project.eu/system/files/Matthias_Brehm_Energietag.pdf.
Cai, C., Wang, L., Khan, S. and Tao, J. 2011. Energy-aware High Performance Computing—A Taxonomy Study. Parallel and Distrib- (56) References Cited

OTHER PUBLICATIONS uted Systems (ICPADS), 2011 IEEE 17th International Conference on. (Tainan, Taiwan. Dec. 7, 2009.
Department of Energy. 2013. CORAL procurement benchmarks. LLNL-PRE-637694. (May 31, 2013). https://asc.llnl.gov/CORAL-benchmarks/CORALBenchmarksProcedure-v26.pdf.
Etinski, M., Corbalan, J. and Labarta, J. Power-Aware Parallel Job Scheduling. Barcelona Supercomputing Center. http://nsfcac.rutgers.edu/GreenHPC/EEHiPC/eehipc_etinski.pdf.
HP, Intel, Microsoft, Phoenix, Toshiba. 2011. Advanced Configuration and Power Interface Specification Revision 5.0. http://www.acpi.info/DOWNLOADS/ACPIspec50.pdf.
Intel® Corp. 2014. Intel® 64 and IA-32 Architectures Software Developer Manuals. http://www.intel.com/content/www/us/en/processors/architectures-software-developer-manuals.html.
Lefurgy, C., Allen-Ware, M., Carter, J., El-Essawy, W., Felter, W., Ferreira, A., Huang, W., Hylick, A., Keller, T., Rajamani, K., Rawson F. and Rubio, J. 2011. Energy-Efficient Data Centers and Systems. 2011 IEEE International Symposium on Workload Charac.
Mämmelä, O., Majanen, M., Basmadjian, R., De Meer, H., Giesler, A. and Homberg, W. Energy-aware job scheduler for high-performance computing. Computer Science—Research and Development 27, No. 4 (2012): 265-275.
Matthieu, H. Power capping in SLURM. Green days @ life, (Nov. 2013).
Rountree, B., Ahn, D., de Supinski, B., Lowenthal, D. and Schulz, M. 2012. Beyond DVFS: A First Look at Performance Under a Hardware-Enforced Power Bound. 8th Workshop on High-Performance, Power-Aware Computing (HPPAC). (May 2012). https://e-reports-ext.II.
2013. Slurm Workload Manager. (Nov. 2013). http://slurm.schedmd.com.
Yoo, A., Jette, M. and Grondona, M. 2003. SLURM: Simple Linux utility for resource management. In, Feitelson, D., Rudolph, L. and Schwiegelshohn, U. editors. Job Scheduling Strategies for Parallel Processing. 9th Springer Verlag International Workshop, JS.
Zhou, Z., Lan, Z., Tang, W. and Desai, N. 2013. Reducing Energy Costs for IBM Blue Gene/P via Power-Aware Job Scheduling. Department of Computer Science, Illinois Institute of Technology; Mathematics and Computer Science Division, Argonne National Laborato.
PCT Notification of Transmittal of the International Search Report and the Written Opinion of the International Searching Authority or the Declaration for PCT Counterpart Application No. PCT/US2012/037812, 10 pgs., (dated Jan. 23, 2013).
PCT Notification concerning Transmittal of International Preliminary Report on Patentability (Chapter I of the Patent Cooperation Treaty) for PCT Counterpart Application No. PCT/US2012/037812, 7 pgs., (dated Nov. 27, 2014).
PCT Written Opinion of the International Searching Authority for PCT Counterpart Application No. PCT/US2012/038405 5 pgs., (dated Feb. 28, 2013).
PCT International Search Report and Written Opinion received for PCT Patent Application No. PCT/US2012/038405, dated May 17, 2012, 3 pages.
PCT Notification concerning Transmittal of International Preliminary Report on Patentability (Chapter I of the Patent Cooperation Treaty) for PCT Counterpart Application No. PCT/US2012/038405, 7 pgs., (dated Nov. 27, 2014).
First Office Action (and English translation) from CN Application No. 200410101227.1, dated Dec. 1, 2006, 27 pgs.
Office Action issued in U.S. Appl. No. 10/859,892, dated Jul. 25, 2006, 10 pgs.
Office Action issued in U.S. Appl. No. 10/859,892, dated Dec. 6, 2006, 9 pgs.
Abstract from W00219078, corresponding to reference CN 1449517A cited in CNOA above, 7 pgs.
Office Action from UK Patent Application No. 0425264.9, dated Sep. 22, 2006, 6 pgs.
Office Action from UK Patent Application No. 0609876.8, dated Sep. 22, 2006, 5 pgs.
Office Action from U.S. Appl. No. 10/871,638, dated Sep. 28, 2006, 13 pgs.
Deva Bodas, et al, "Simple Power-Aware Scheduler to Limit Power Consumption by HPC System within a Budget," Intel Corporation (U.S. Appl. No. 62/040,576). 10 pages.
"Office Action issued in U.S. Appl. No. 14/582,756, dated Aug. 25, 2016", 26.
"Office Action issued in U.S. Appl. No. 14/582,756, dated Feb. 16, 2016", 22.
"Office Action issued in U.S. Appl. No. 14/582,764, dated Jun. 13, 2016", 16.
"Office Action issued in U.S. Appl. No. 14/582,764, dated Jul. 14, 2017", 12.
"Office Action issued in U.S. Appl. No. 14/582,764, dated Nov. 16, 2016", 12.
"Office Action issued in U.S. Appl. No. 14/582,756, dated Jan. 12, 2017", 26.
"Office Action issued in U.S. Appl. No. 14/582,795, dated Jun. 1, 2016", 14.
Zhai et al., HaPPy: Hyperthread-aware Power Profiling Dynamically, 2014 USENIX Annual Technical Conference, Jun. 2014.
Silberschatz et al., Operating System Concepts, 2013, John Wiley & Sons, Inc.
Activity Monitor Demystified, Skvorc, 2012.
The Office Action for U.S. Appl. No. 14/582,772, 21 pages, dated Nov. 11, 2017.
Supplementary European Search Report for European Patent Application No. EP15833962, dated Mar. 9, 2018.
PCT Notification concerning Transmittal of International Preliminary Report on Patentability (Chapter I of the Patent Cooperation Treaty) for PCT Counterpart Application No. PCT/US2012/038405, 7 pages (Nov. 27, 2014).
Laboratory. JSSPP 2013, total 20 pages. http://www.cs.huji.ac.il/.about.feit/parsched/jsspp13/zhou.pdf.
Karthik Ganesan et al: "System-level max power (SYMPO)", Proceedings of the 19th International Conference on Parallel Architectures and Compilation Techniques, Pact '10, ACM Press, New York, New York, USA, Sep. 11, 2010 (Sep. 11, 2010), pp. 19-28.
International Search Report and Written Opinion received for PCT Patent Application No. PCT/US2015/036435, dated Sep. 18, 2015, 14 pages.
International Search Report and Written Opinion received for PCT Patent Application No. PCT/US2015/036294, dated Sep. 25, 2015, 10 pages.
International Preliminary Report on Patentability received for PCT Patent Application No. PCT/US2015/036435, dated Mar. 9, 2017, 13 pages.
International Preliminary Report on Patentability received for PCT Patent Application No. PCT/US2015/036403, dated Mar. 9, 2017, 10 pages.
International Preliminary Report on Patentability received for PCT Patent Application No. PCT/US2015/036294, dated Mar. 9, 2017, 9 pages.
European Search Report and Search Opinion Received for EP Application No. 15833962.2, dated Mar. 19, 2018, 9 pages.
European Search Report and Search Opinion Received for EP Application No. 15833856.6, dated May 14, 2018, 14 pages.
European Search Report and Search Opinion Received for EP Application No. 15834071.1, dated Mar. 29, 2018, 14 pages.
The Office Action for U.S. Appl. No. 14/582,783, 42 pages, dated Mar. 9, 2017.
The Office Action for U.S. Appl. No. 14/582,764, 13 pages, dated Mar. 14, 2017.
The Office Action for counterpart U.S. Appl. No. 14/582,743, 38 pages, dated Mar. 9, 2017.
Anonymous: "Benchmark (computing)—Wikipedia", Aug. 15, 2014 (Aug. 15, 2014), XP055458168, Retrieved from the Internet: URL:https://en.wikipedia.org/w/index.php?title=Benchmark (computing)&oldid=621396505.

* cited by examiner

METHODS AND APPARATUS TO MANAGE JOBS THAT CAN AND CANNOT BE SUSPENDED WHEN THERE IS A CHANGE IN POWER ALLOCATION TO A DISTRIBUTED COMPUTER SYSTEM

CROSS-REFERENCE TO RELATED APPLICATIONS

The present application claims the benefit of prior U.S. Provisional Patent Application No. 62/040,576, entitled "SIMPLE POWER-AWARE SCHEDULER TO LIMIT POWER CONSUMPTION BY HPC SYSTEM WITHIN A BUDGET" filed on Aug. 22, 2014, which is hereby incorporated by reference in its entirety.

The present application is related to the U.S. patent application Ser. No. 14/582,795 entitled METHODS AND APPARATUS TO ESTIMATE POWER PERFORMANCE OF A JOB THAT RUNS ON MULTIPLE NODES OF A DISTRIBUTED COMPUTER SYSTEM, filed Dec. 24, 2014; the U.S. patent application Ser. No. 14/582,783 entitled METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE, filed Dec. 24, 2014; the U.S. patent application Ser. No. 14/582,979 entitled ADJUSTMENT OF EXECUTION OF TASKS, filed Dec. 24, 2014; the U.S. patent application Ser. No. 14/582,985 entitled CONTROL OF POWER CONSUMPTION, filed Dec. 24, 2014; the U.S. patent application Ser. No. 14/582,988 entitled FORECAST FOR DEMAND OF ENERGY, filed Dec. 24, 2014; the U.S. patent application Ser. No. 14/582,743 entitled MANAGING POWER PERFORMANCE OF DISTRIBUTED COMPUTING SYSTEMS, filed Dec. 24, 2014; the U.S. patent application Ser. No. 14/582,756 entitled "PROFILING A JOB POWER AND ENERGY CONSUMPTION FOR A DATA PROCESSING SYSTEM," filed Dec. 24, 2014; and the U.S. patent application Ser. No. 14/582,764 entitled "A POWER AWARE JOB SCHEDULER AND MANAGER FOR A DATA PROCESSING SYSTEM", filed Dec. 24, 2014.

FIELD

Embodiments of the disclosure generally relate to the field of power conservation in computer systems. More specifically, one embodiment of the disclosure relates to managing jobs of a distributed computer system when there is a change to the power allocation to the distributed computer system.

GENERAL BACKGROUND

A distributed computer system may perform parallel computing by the simultaneous use of multiple nodes to execute a computational assignment referred to as a job. Each node may include one or more processors, memory, an operating system, and one or more input/output (I/O) components. The nodes may communicate with each other through a high speed network fabric and may use shared file systems or storage. The job may be divided into thousands of parallel tasks distributed over thousands of nodes. These nodes may synchronize with each other hundreds of times a second.

Future distributed computer systems are projected to require tens of megawatts of power, making their power management a foremost concern in the industry. These distributed computer systems will be expected to deliver exascale performance with limited power and energy budgets. Current distributed computer systems may apply power capping to adhere to the limited power and energy budgets. However, regardless of power capping, the power allocation to a distributed computer system ("the system") may be decreased such that the power being consumed by the system exceeds the power allocated to the system.

The management of currently running jobs, suspended jobs and newly requested jobs in a queue of the system is critical in maintaining expected performance of the system and ensuring power consumed by the system remains less than the power allocated to the system. As the power allocated to the system fluctuates, there may be a need to suspend and/or terminate one or more currently running jobs, resume one or more suspended jobs and/or start one or more new jobs already in the queue. In addition, the system may be required to adhere to priorities regarding power allocation to certain types of jobs.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to managing jobs being processed by a distributed computer system ("currently running jobs"), jobs suspended by the distributed computer system ("suspended jobs") and newly requested jobs placed in the queue of the distributed computer system ("new jobs"). In one embodiment, the management of the jobs may require that the distributed computer system attempt to reduce the power consumed by one or more jobs prior to suspending and/or terminating one or more jobs. In a second embodiment, the management of the jobs may require that the distributed computer system suspend and/or terminate one or more jobs when the power allocated to the distributed computer system is decreased. Additionally, the management of the jobs may allow the distributed computer system to resume one or more suspended jobs and/or start one or more new jobs. The management of the jobs may rely on estimates generated by the distributed computer system as discussed in the U.S. patent application Ser. No. 14/582,795 entitled "Methods and apparatus to estimate power performance of a job that runs on multiple nodes of a distributed computer system." The distributed computer system may be, for example, a High Performance Computing (HPC) system. In some embodiments of the disclosure, a job may not be subjected to a power policy that limits the power supplied to a job as set forth by the owner of the job;

however, a HPC system may, and likely will, have an overall limited power budget that cannot be exceeded by the combination of jobs processed by the HPC system.

Embodiments of the disclosure relate to determining whether a decrease in power allocated to the system requires that one or more current jobs be suspended and/or terminated. Other embodiments of the disclosure relate to determining whether an increase in power allocated to the system, or an increase in available power (e.g., a job finished processing) allows the HPC system to resume one or more suspended jobs and/or start a new job waiting in the queue of the HPC system. Certain embodiments relate to determining priorities of particular jobs and/or job types within the HPC system when determining which one or more jobs to suspended, terminate, resume and/or start.

Some embodiments of the disclosure relate to determining whether power consumption of one or more jobs may be reduced when the power consumed by the system is within a predefined threshold (e.g., a system guardband) from the power allocated to the system. The power consumed by one or more jobs may be reduced in order to utilize the greatest number of compute nodes as possible. Therefore, in one embodiment, when the power consumed by one or more jobs is reduced, the retrieved power may be combined with unallocated power and used to start a new job or resume a suspended job.

Figure 1:
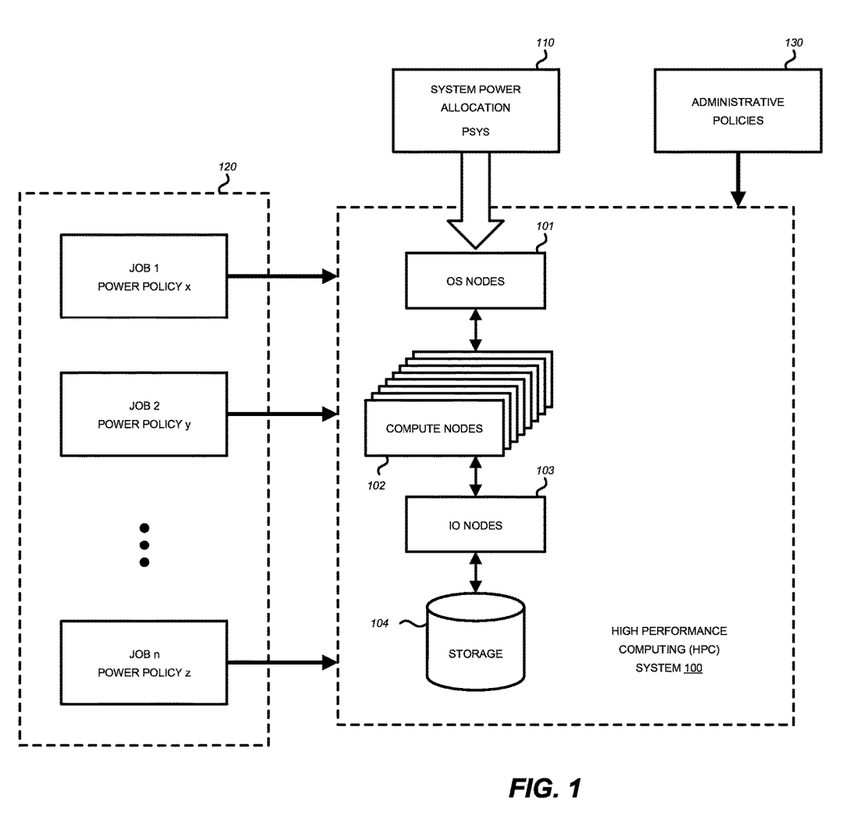
FIG. 1 is an exemplary block diagram of a HPC system 100 receiving a plurality of inputs.

Referring to FIG. 1, an exemplary block diagram of a HPC system receiving various inputs is shown. The HPC system 100 includes one or more operating system (OS) nodes 101, one or more compute nodes 102, one or more input/output (I/O) nodes 103 and a storage 104. A high-speed fabric communicatively connects the OS node 101, the compute nodes 102 and the I/O nodes 103. The high-speed fabric may be a network topology of nodes interconnected via one or more switches. In one embodiment, as illustrated in FIG. 1, the I/O nodes 103 are communicatively connected to the storage 104. The storage 104 may be non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

The OS node 101 may provide a gateway to accessing the compute nodes 102. For example, prior to submitting a job for processing on the compute nodes 102, a user may be required to log-in to the HPC system 100 which may be through the OS node 101. In embodiments of the disclosure, the OS node 101 may accept jobs submitted by users and assist in the launching and managing of jobs being processed by the compute nodes 102. In one embodiment, the OS node 101 comprises a power monitor (not shown), as described in the U.S. patent application Ser. No. 14/582,756 entitled "Methods and apparatus to profile power and energy consumption by a job running in multiple nodes and uses shared resources of a distributed computer system (HPC)"; a power estimator (not shown); and a power calibrator (not shown) as described in the U.S. patent application Ser. No. 14/582,783 entitled "Methods and apparatus to generate and use power, thermal and performance characteristics of nodes to improve energy efficiency and reducing wait time for jobs in the queue."

In one embodiment, the compute nodes 102 provide the bulk of the processing and computational power. The I/O nodes 103 may provide an interface between the compute nodes 102 and external devices (e.g., separate computers) that may provide input to the HPC system 100 or receive output from the HPC system 100.

The system power allocation ($P_{sys}$) may be provided to the HPC system 100 by, for example, a utility management facility (e.g., as determined by a system administrator or management software such as a datacenter manager). Typically, the $P_{sys}$ will be a limited amount of power allocated to the HPC system 100 with which the HPC system 100 will use to run one or more of the jobs 120. The jobs 120 comprise one or more jobs requested to be run by the HPC system 100 by one or more users. Each job includes a "power policy," which will be discussed in-depth below. The power policy will assist the HPC system 100 in allocating power for the job and aid in the management of the one or more jobs 120 being run by the HPC system 100.

In addition, the administrative policies 130 will guide the management of running the jobs 120 by providing an over-arching policy that defines the operation of the HPC system 100. Examples of policies that may be included in the administrative policies 130 include, but are not limited or restricted to, (1) maximize utilization of all hardware and software resources (e.g., instead of running fewer jobs at high power and leaving resources unused, run as many jobs as possible to use as much of the resources as possible); (2) a job with no power limit is given the highest priority among all running jobs; and/or (3) suspended jobs are at higher priority for resumption. Such administrative policies govern the way the HPC system 100 may schedule, launch, suspend and re-launch one or more jobs.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "power monitoring" should be interpreted as dynamically measuring power consumption by one or more of the components comprising the HPC system. The measurements taken may be used to calculate power consumption by, example, an individual job and/or a group of jobs, as well as to provide statistics on the overall power consumption of the HPC system.

The term "power policy" should be interpreted as an input (e.g., one or more parameters) provided to the HPC system that provide guidance on allocation and management of power for a given job. The input may be provided as part of a job request submission and/or may be provided as a separate input (e.g., via a user interface screen or a configuration file). For example, the input may indicate, among other things, (i) whether a job may be subjected to a power limit, (ii) the maximum and/or minimum power at which a job may run and/or (iii) a minimum and/or maximum frequency at which the one or more nodes processing the job may operate.

The term "node" should be construed as one or more processors optionally grouped with, at least, a system memory and/or one or more input/output (I/O) components. The one or more processors, the system memory and the one or more I/O components may be referred to as the "components" of a node throughout the specification and claims. Throughout the specification and claims, the terms "processor," "computer processing unit (CPU)," and "core" will be used interchangeably.

The term "job" should be interpreted as predetermined calculations performed on the HPC system. For example, a user (e.g., owner of the job) may request that a job be run by the HPC which means the user is requesting to have one or more compute nodes performing calculations according to input parameters and/or data provided by the user. The job request may specify the one or more calculations (e.g., an application) that are to be used for the processing of the job.

The term "system power ($P_{sys}$)" should be interpreted as the amount of power provided to the HPC system by, for example, a facility or datacenter manager. The $P_{sys}$ is the total amount of power the HPC system has to allocate to one or more jobs at any given time.

The term "guard band" should be interpreted as a mechanism to assist in the management of a power budget of a HPC system. In one embodiment, the guard band may an extra power allocation, which may be a predetermined percentage of the power allocated to the job. For example, if a HPC system has 3 MW of power to allocate to a job, the HPC system may only allocate 2.8 MW and maintain 0.2 MW as the guard band to prevent a spike in calculations to cause the power consumption of the job to exceed 3 MW. One purpose of the guard band is to maintain consistent power consumption by a job.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for power management of a distributed computer system, such as a High Performance Computing (HPC) system. In particular, embodiments of the disclosure relate to managing power allocation to one or more jobs run in a HPC system based on estimates of the power consumption for each job as a result of calibration of the nodes within the HPC system. As this invention is susceptible to embodiments of many different forms, it is intended that the present disclosure is to be considered as an example of the principles of the invention and not intended to limit the invention to the specific embodiments shown and described.

II. Power Aware Distributed Computer System

Figure 2:
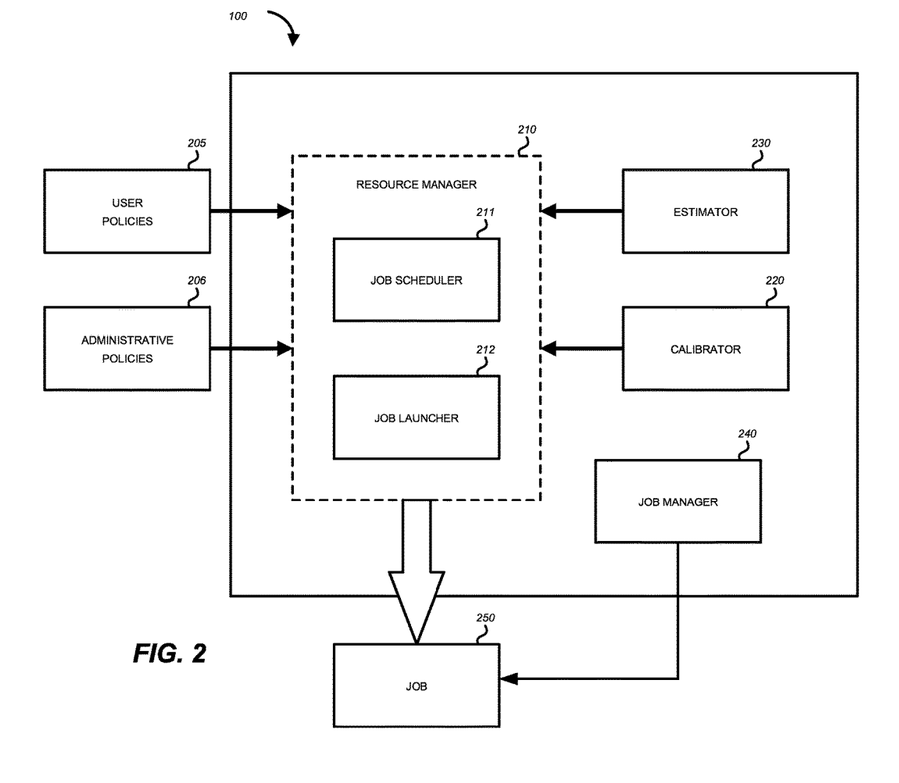
FIG. 2 is an exemplary block diagram of logic comprising the HPC system 100.

Referring to FIG. 2, an exemplary block diagram of logic comprising the HPC system 100 is shown. The logic of the HPC system 100 illustrated in FIG. 2 comprises the power management for the HPC system 100 and includes a resource manager 210 including a power aware job scheduler 211 and a power aware job launcher 212, a calibrator 220, an estimator 230, one or more job managers 240 (each job will have its own job manager), a job 250, the user policies 205 and the administrative policies 130. In one embodiment, the resource manager 210 and job manager 240 are configured to collect job power data.

The calibrator 220 calibrates the power, thermal dissipation and performance of each node within the HPC system 100. The calibrator 220 may provide a plurality of methods for calibrating the nodes within the HPC system 100. In one embodiment, the calibrator 100 may provide a first method of calibration in which every node within the HPC system 100 runs a sample workload (e.g., a mini-application, a portion of an application and/or a test script) so the calibrator 220 may sample one or more measurements (e.g., power consumed) at a predetermined time interval in order to determine, inter alia, (1) the average power, (2) the maximum power, and (3) the minimum power for each node. In addition, the sample workload may be run on each node at every operating frequency of the node. In another embodiment, the calibrator 220 may provide a second method of calibration in which calibration of one or more nodes occurs during the run-time of a job. In such a situation, the calibrator 220 may sample the one or more nodes on which a job is running (e.g., processing). In the second method, the calibrator 220 obtains power measurements of each node during actual run-time.

The estimator 230 provides the resource manager 210 with estimates of power consumption for each job enabling the resource manager 210 to efficiently schedule and monitor each job requested by one or more job owners (e.g., users). The estimator 220 may provide a power consumption estimate based on, for example, maximum and average power values stored in a calibrator database, wherein the calibrator database is populated by the processing of the calibrator 220. In addition, the minimum power required for each job may be considered. Other factors that may be used by the estimator 230 to create a power consumption estimate include, but are not limited or restricted to, whether the owner of the job permits the job to be subject to a power limit, the job power policy limiting the power supplied to the job (e.g., a predetermined fixed frequency at which the job will run, a minimum power required for the job, or varying frequencies and/or power supplied determined by the resource manager 210), the startup power for the job, the frequency at which the job will run, the available power to the HPC system 100 and/or the allocated power to the HPC system 100.

The each job requested by a user (e.g., the owner of the job) is accompanied by a user policy 205 (also illustrated in FIG. 1). The user policy includes at least a decision on whether the job 250 may be subjected to a power limit, if a power limit is permitted the policy to limit the power (e.g., fixed frequency, minimum power required, or varying frequency and/or power determined by the resource manager 210), and whether the job 250 may be suspended.

In one embodiment, a power aware job scheduler 211 is configured to receive a selection of a mode for a job (e.g., included within the user policies 205), to determine an available power for the job based on the mode and to allocate a power for the job based on the available power. In one embodiment, the power aware job scheduler 211 is configured to determine a uniform frequency for the job based on the available power. In one embodiment, the power aware job scheduler 211 is configured to determine the available power for the job based on at least one of a monitored power, an estimated power, and a calibrated power. The power aware job scheduler 211 and resource manager 210 are configured to receive information regarding power consumption, to distribute the power budget to each job, and to implement a uniform frequency mechanism to limit power, as described in further detail below.

The resource manager 210 uses power aware job scheduler 211 and power aware job launcher 212 to schedule and launch a job based on the received power inputs, e.g., the user policies 205 and the administrative policies 206. In one embodiment, the resource manager 210 is a software object that is responsible for allocation of compute and I/O resources for interactive and batch jobs that one or more users want to run. Typically, the resource manager 210 is also responsible for scheduling the jobs out of the job queue and launching the jobs to run as scheduled. A job manager 240 is configured to control a job to stay within an allocated power budget for the job, as described in further detail below. In one embodiment, the job manager 240 is responsible for operating a job within the constraints of one or more power policies after the job has been launched. In one embodiment, the job manager 240 is used to control power performance of all components (e.g., nodes, or other components) involved in execution of a job as per policies specified by at least one of the user and/or administrator. The power aware job scheduler 211 and the job manager 240.

Figure 3:
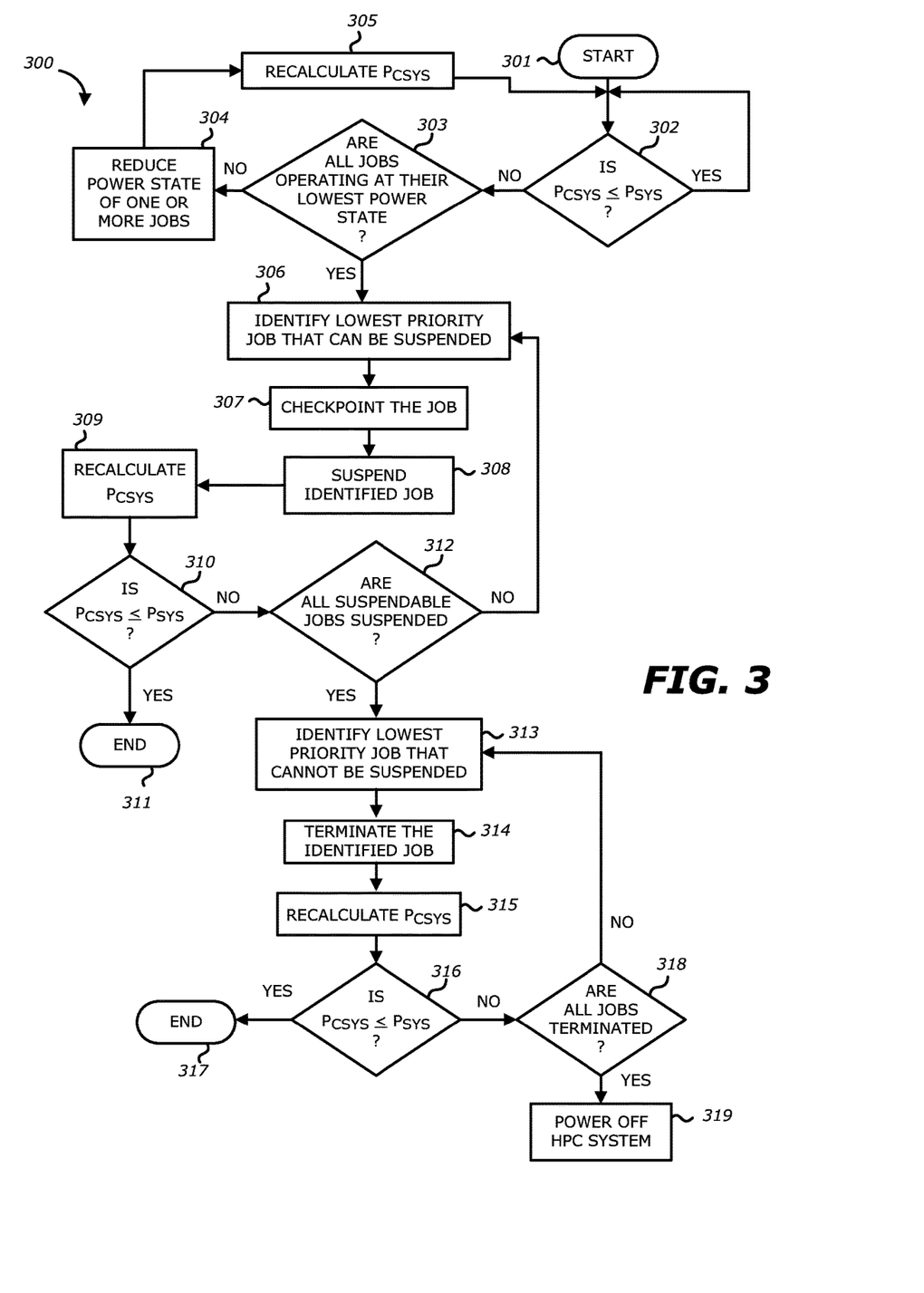
FIG. 3 is a flowchart illustrating a sample method of managing jobs within the HPC system 100 when the power consumed by the system exceeds the power allocated to the system.

Referring to FIG. 3, a flowchart illustrating a sample method of managing jobs within the HPC system 100 when the power consumed by the system exceeds the power allocated to the system is shown. Each block illustrated in FIG. 3 represents an operation performed in the method 300 of managing the jobs within the HPC system 100 by suspending one or more jobs and/or terminating one or more jobs. The method 300 illustrates operations conducted by the job scheduler 211, the job manager 240 and the estimator 220 on the compute nodes 102 in efforts to, automatically, without human interaction, manage the jobs of the HPC system 100 when the power allocated to the HPC system 100 is decreased.

In operation 301, the method 300 is started. In operation 302, a determination is made as to whether the power consumed to the HPC system 100 ($P_{csys}$) is less than or equal to the power allocated to the HPC system 100 ($P_{sys}$). When the $P_{sys}$ is greater than the $P_{csys}$ (yes at operation 302), the HPC system 100 monitors whether any further fluctuations in power allocation to the HPC system 100 result in the $P_{csys}$ being greater than $P_{sys}$. When $P_{sys}$ is less than the $P_{csys}$ (no at operation 302), a determination as to whether all current jobs are operating at their lowest power state is made (operation 303). In one embodiment, a job may operate at its lowest power state when a minimum power for processing is requested by the owner of the job and the job is processing at the minimum power requested. In another embodiment, the user may have requested a specific frequency at which the compute nodes 102 are to process the job and the power state of the compute nodes 102 while the compute nodes 102 operate at the requested frequency may be the lowest power state for the given job. In another embodiment, in which the job manager 240 automatically adjusts the frequency of a job (e.g. lowers the frequency to the lowest operating frequency of the compute nodes 102), the job may be operating at its lowest power state (e.g., consuming the least amount of power for the job).

When all current jobs are not operating at their lowest power state (no at operation 303), the HPC system 100 reduces the operating power state or power allocation of one or more jobs (operation 304). In one embodiment, the lowest frequency of each job is determined by the resource manager 210 while analyzing the power policies associated with the HPC system 100 and/or the individual job (e.g., in one embodiment, operating at the lowest frequency may consume the least amount of power placing the job in its lowest power state). In another embodiment, a job may have a power policy that no power limit should be applied to the processing of the job. In such a situation, the compute nodes 102 processing the job are to always operate at their highest frequency and consume the maximum amount of power possible; therefore, the operating frequency and power state cannot be reduced. In a second embodiment, a job may have a power policy that allows that HPC system 100 to set the power allocated to the job and/or the operating frequency of the compute nodes 102 processing the job. In such a situation, the HPC system 100 may determine whether the operating frequency of the compute nodes 102 may be reduced, thereby reducing the power state. Subsequently, the $P_{csys}$ is recalculated (operation 305) and the method 300 returns to operation 302 to determine whether $P_{csys}$ is less than or equal to $P_{sys}$.

When all current jobs are operating at their lowest power state (yes at operation 303), the lowest priority running job that may be suspended is identified (operation 306). In some embodiments, whether a job may be suspended depends on whether the owner of the job elected such a policy, whether the HPC system 100 has certain policies regarding suspension of jobs (e.g., all jobs may be suspended) and/or whether the job supports checkpointing. Checkpointing involves saving the state of the job in order to preserve the progress of processing the job In case of a failure in hardware or software, checkpointing allows a job to be resumed from the last known working state. In some embodiments, the checkpointing may occur at predefined intervals, immediately preceding the suspension of the job or both. At operation 307, the identified job undergoes checkpointing and at operation 308, the identified job is suspended.

At operation 309, the $P_{csys}$ is recalculated taking into consideration the recently suspended job. The term "recalculating" may mean to measure one or more components of one or more of the compute nodes 102, reference the calibrator database, request a new power estimate from the estimator 230 and/or perform calculations based on one or more measurements. At operation 310, a determination is made as to whether the $P_{csys}$ is less than or equal to the $P_{sys}$. If the $P_{csys}$ is less than or equal to the $P_{sys}$ (yes at operation 310), the method 300 is complete (311).

If the $P_{csys}$ is not less than or equal to the $P_{sys}$ (no at operation 310), a determination is made as to whether all suspendable jobs have been suspended (operation 312). When all suspendable jobs have not been suspended (no at operation 312), the method 300 returns to operation 306 in which the lowest priority running job is identified. Alternatively, when all suspendable jobs have been suspended (yes at operation 312), the current job having the lowest priority is identified (operation 313). At operation 314, the identified job is terminated.

At operation 315, the $P_{csys}$ is recalculated taking into consideration the recently terminated job. At operation 316, a determination is made as to whether the $P_{csys}$ is less than or equal to the $P_{sys}$. If the $P_{csys}$ is less than or equal to the $P_{sys}$ (yes at operation 316), the method 300 is complete (operation 317).

If the $P_{csys}$ is not less than or equal to the $P_{sys}$ (no at operation 316), a determination is made as to whether all jobs have been terminated (operation 318). When all jobs have not been terminated (no at operation 318), the method 300 returns to operation 313 to identify the lowest priority job that cannot be suspended. When all jobs have been terminated (yes at operation 318), the HPC system is forced to power off (operation 319).

Figure 4A:
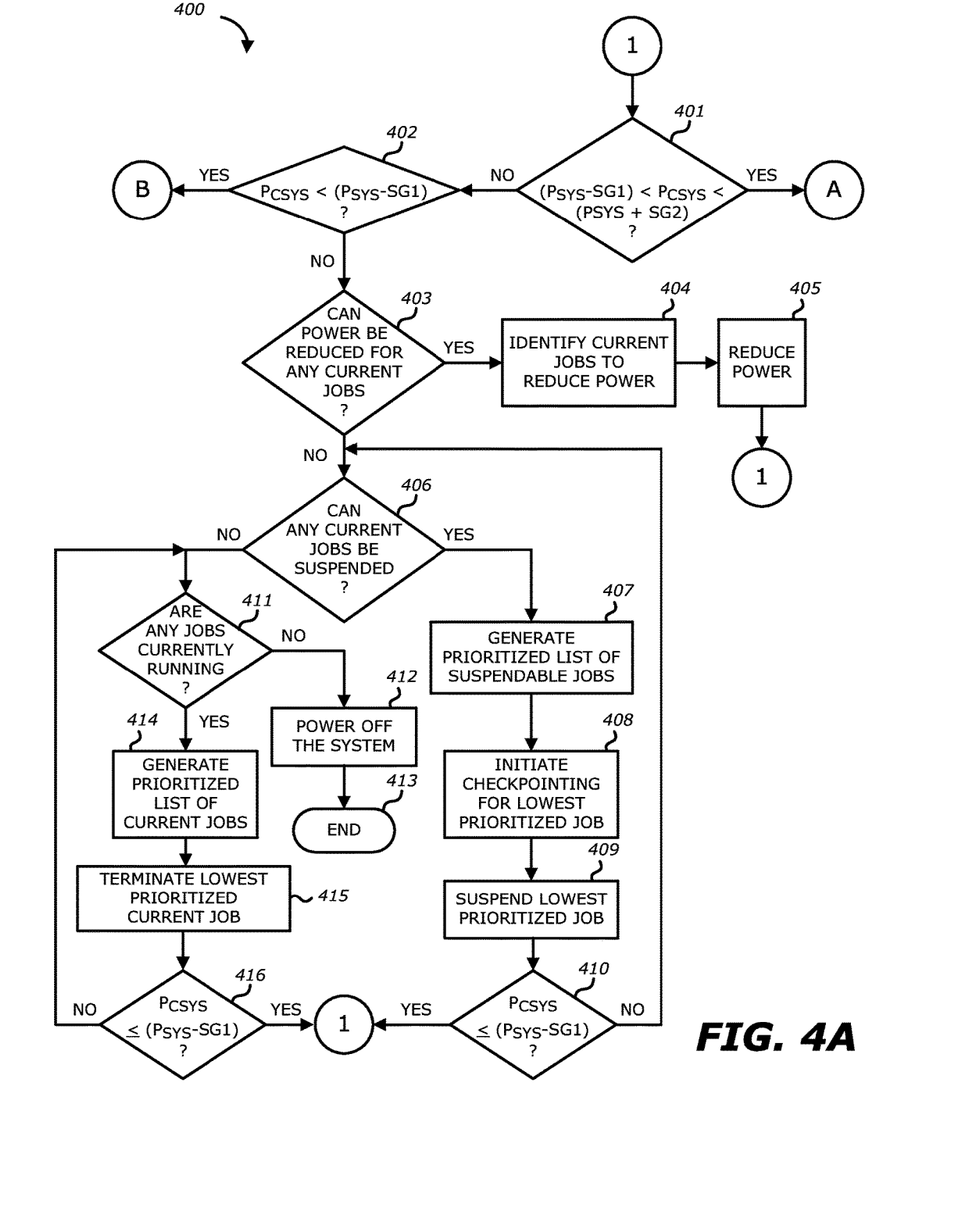
FIGS. 4A-4C comprise a flowchart illustrating one embodiment of a method for managing one or more jobs when the power consumed by the HPC system 100 is less than or approximately equal to the power allocated to the HPC system 100.
Figure 4B:
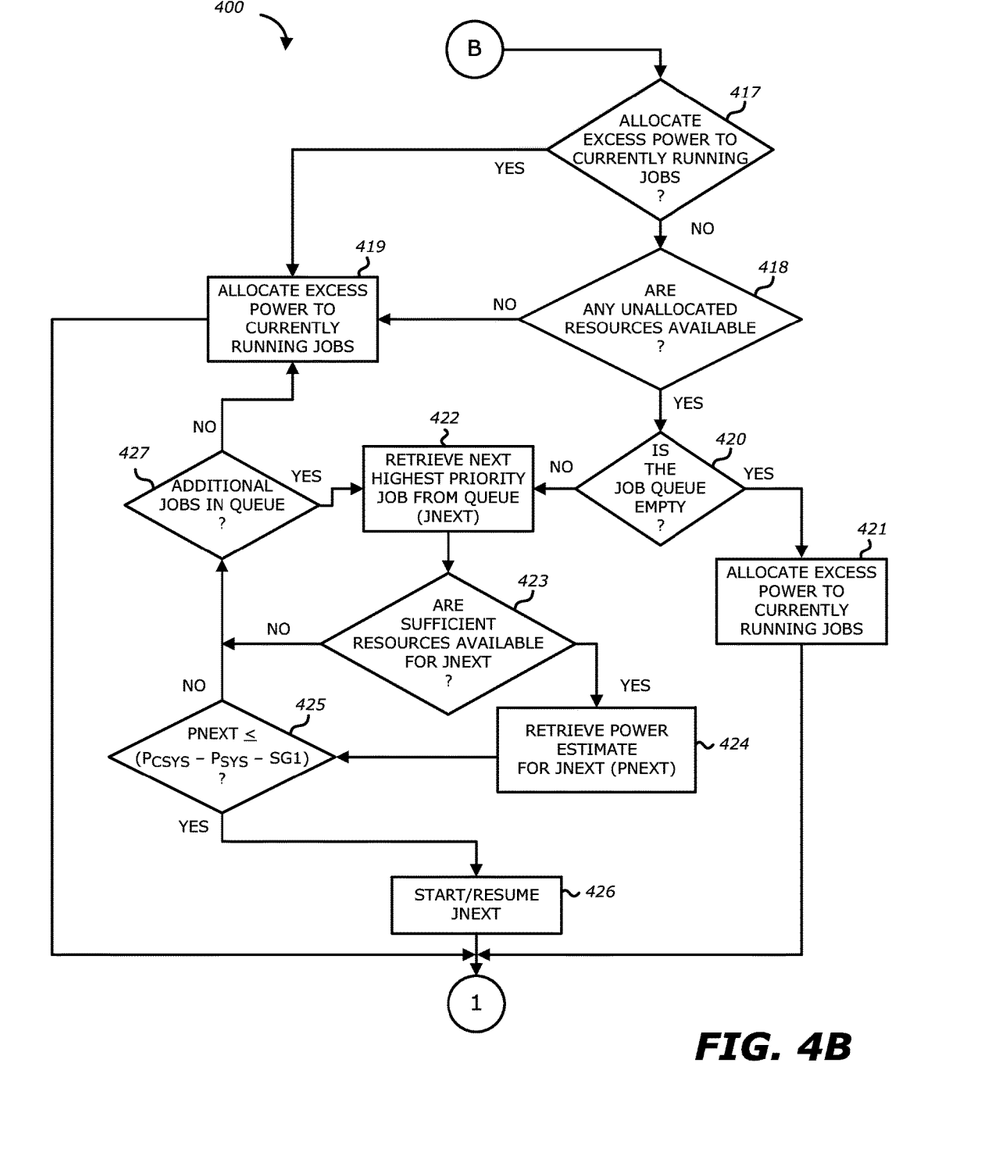
Figure 4C:
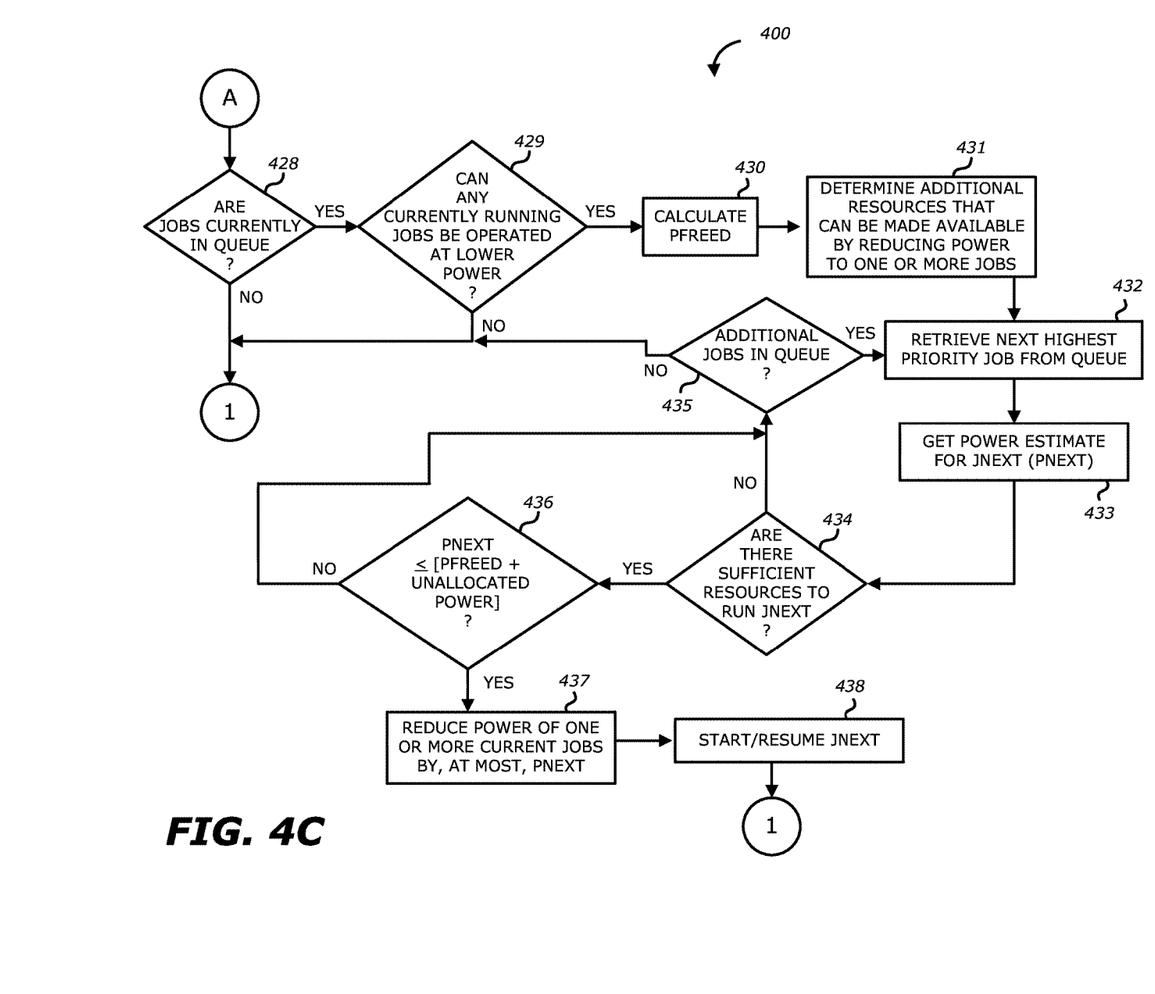

FIGS. 4A-4C illustrate one embodiment of the method 400 for managing one or more jobs when the power consumed by the HPC system 100 ($P_{csys}$) is less than or approximately equal to the power allocated to the HPC system 100 ($P_{sys}$). Referring to FIG. 4A, a determination is made as to whether the power consumed is between the power allocated to the system plus a first system guardband and the power allocated to the system minus a second system guardband (operation 401). When the determination of operation 401 yields a positive answer (yes at operation 401), the method 400 is taken to operation 428, which is discussed in detail in FIG. 4C. When the determination of operation 401 yields a negative answer (no at operation 401), a determination as to whether the power consumed is less than the power allocated minus the first system guardband (operation 402). It should be noted that Pcsys and Psys are average values, e.g., an average rate of consumption of energy over time. The system guardbands serve the purpose of accounting for minor fluctuations in power consumption.

When the determination at operation 402 yields a positive result (yes at operation 402), the method 400 is taken to operation 417, which is discussed in detail in FIG. 4B. When the determination at operation 402 yields a negative result (no at operation 402), a determination as to whether power can be reduced for one or more of the current jobs (e.g., currently running on the HPC system 100) (operation 403). When power can be reduced to one or more current jobs (yes at operation 403), the one or more current jobs for which power is to be reduced are identified (operation 404). Examples of reducing the power are discussed above. At operation 405, the power of the one or more identified current jobs is reduced and the method 400 subsequently returns to operation 401.

When the power of one or more current jobs cannot be reduced (no at operation 403), a determination is made as to whether any current jobs may be suspended (operation 406). When one or more current jobs may be suspended (yes at operation 406), a prioritized list of suspendable jobs is generated (operation 407). At operation 408, the lowest prioritized suspendable job on the generated list is instructed to implement checkpointing. When checkpointing as completed, the lowest prioritized suspendable job will be suspended (operation 409). At operation 410, a determination is made as to whether the power consumed is less than or equal to the power allocated minus the first system guardband. When the power consumed is less than or equal to the power allocated minus the first system guardband (yes at operation 410), the method 400 returns to operation 401. When the power consumed is not less than the power allocated minus the first system guardband (no at operation 410), the method 400 returns to operation 406 to determine if any current jobs may be suspended.

When no current jobs may be suspended (e.g., user policies and/or system policies prevent such action and/or no current jobs support checkpointing) (no at operation 406), a determination is made as to whether one or more jobs are currently running (operation 411). When no jobs are currently running on the HPC system 100, the HPC system 100 is forced to power down (operation 412) and subsequently, the method 400 ends (operation 413).

When one or more jobs are currently running (yes at operation 411), a prioritized list of current jobs is generated (operation 414). At operation 415, the lowest prioritized job on the generated list is terminated (in one embodiment, the list may prioritize both currently running jobs and suspended jobs in one list). At operation 416, a determination is made as to whether the power consumed is less than or equal to the power allocated minus the first system guardband. When the power consumed is less than or equal to the power allocated minus the first system guardband (yes at operation 416), the method 400 returns to operation 401. When the power consumed is not less than or equal to the power allocated minus the first system guardband (no at operation 416), the method 400 returns to operation 411 to determine if there are any jobs currently running.

Referring to FIG. 4B, when the determination at operation 402, of FIG. 4A, yields a positive result (yes at operation 402), a determination is made as to whether a preference to allocate excess power to current jobs (operation 417). In one embodiment, the preference may be derived from user policies and/or system policies. When a preference exists to allocate excess power to current jobs (yes at operation 417), the excess power is allocated to currently running jobs (operation 420) and the method 400 returns to operation 401.

Excess power may be allocated to currently running jobs in a plurality of ways. Examples of ways the resource manager 210 may allocate the excess power include, but are not limited or restricted to, equally among each currently running job, to the currently running job having the longest running time then the second longest (once the first job is operating at its highest power state), etc., to the currently running job having the highest priority then the second highest priority (once the first job is operating at its highest power state), etc., or proportionally to each currently running job (e.g., proportional to running time for each job, proportional to priority for each job, etc.). Examples of ways of prioritizing jobs for allocation of excess power include, but are not limited or restricted to, a prioritized listing of the currently running jobs, the amount of time each currently running job has been running, the power state of each currently running job (e.g., comparison of jobs running at their lowest power state with those running near their highest power state), the number of compute nodes 102 currently processing each currently running job and/or the amount of additional power each currently running job may require to run at its next power state.

When a preference does not exist to allocate excess power to current jobs (no at operation 417), a determination is made as to whether any unallocated resources are available (operation 418). Examples of resources include, but are not limited or restricted to, one or more compute nodes and/or one or more storage devices. When unallocated resources are not available (no at operation 418), the excess power is allocated to currently running jobs (operation 419) and the method 400 returns to operation 401. When unallocated resources are available to begin processing another job (yes at operation 418), a determination is made as to whether the job queue is empty (operation 420). The HPC system 100 maintains a job queue for jobs waiting to be processed by the system. In one embodiment, the job queue may contain both new jobs that have yet to start processing on the system as well as jobs that were previously processing on the system but have been suspended. An alternative embodiment may include separate queues, one for new jobs and one for suspended jobs. The disclosure will assume the job queue is a single queue that may include both new jobs and/or suspended jobs.

When the job queue is empty (yes at operation 420), the excess power is allocated to currently running jobs (operation 421) and the method 400 returns to operation 401.

When the job queue is not empty (no at operation 420), $J_{next}$, being the next highest priority job in the queue, is retrieved (operation 422). At operation 423, a determination is made as to whether sufficient resources are available for $J_{next}$ (e.g., whether enough compute nodes of the compute nodes 102 available). When sufficient resources are not available for $J_{next}$ (no at operation 423), a determination is made as to whether additional jobs are in the queue (operation 427). When more jobs are present in the queue (yes at operation 427), the method 400 returns to operation 422 to retrieve the next highest priority job from the queue. When no additional jobs are in the queue (no at operation 427), the excess power is allocated to currently running jobs (operation 419) and the method 400 subsequently returns to operation 401.

However, when sufficient resources are available for $J_{next}$ (yes at operation 423), a power estimate for $J_{next}$ is retrieved (operation 424). The power estimate may be generated by the estimator 230. When the power estimate has been generated, a determination is made as to whether there is sufficient unallocated power to run $J_{next}$ on the unallocated resources (operation 425). When there is sufficient unallocated power to run $J_{next}$ (yes at operation 425), $J_{next}$ is started when $J_{next}$ is a new job or $J_{next}$ is resumed when $J_{next}$ is a suspended job (operation 426). When there is not sufficient unallocated power to run $J_{next}$ (no at operation 425), a determination is made as to whether additional jobs are in the queue (operation 427), as discussed above.

Referring to FIG. 4C, when the determination of operation 401 yields a positive answer (yes at operation 401), a determination is made as to whether jobs are currently in the queue (operation 428). When jobs are not currently in the queue (no at operation 428), the method 400 returns to operation 401. When jobs are currently in the queue (yes at operation 428), a determination as to whether any currently running jobs may be operated at a lower power (operation 429). The determination as to whether any currently running jobs may be operated at a lower power is made to determine whether power can be power can be reallocated to run additional jobs (e.g., one or more jobs waiting in the queue).

When no current jobs can be processed at a lower power (no at operation 429), the method 400 returns to operation 401. However, when one or more current jobs can be operated at a lower power (yes at operation 429), the amount of power that can be made available ($P_{freed}$) by operating current jobs at lower power states. $P_{freed}$ freed plus any power unallocated by the system may be reallocated to a new or suspended job.

At operation 431, the additional resources that can be made available by reducing power to one or more jobs are determined Subsequently, at operation 432, $J_{next}$ is retrieved from the job queue and at operation 433, a power estimate ($P_{next}$) 1 is generated from $J_{next}$. The job queue and retrieval (e.g., organization and retrieval based on priority) is discussed above. Similarly, the generation of a power estimate is also discussed above.

At operation 434, a determination is made as to whether there are sufficient unallocated resources available to run $J_{next}$. When there are not sufficient unallocated resources available to run $J_{next}$ (no at operation 434), a determination is made as to whether additional jobs are in the queue (operation 435), as discussed above. When no additional jobs are present in the queue (no at operation 435), the method 400 returns to operation 400. When additional jobs are present in the queue (yes at operation 435), the method 400 returns to operation 432 to retrieve the next highest priority job from the queue.

However, when there are available resources to run a job (e.g., available nodes and unallocated power) (yes at operation 434), the additional resources that can be made available by reducing the power consumed by one or more jobs are determined (operation 432). At operation 433, the job having the next highest priority is retrieved from the queue. At operation 434, the power estimate for $J_{next}$ is obtained (e.g., by requesting an estimate from the estimator 230). At operation 435, a determination is made as to whether sufficient resources are available to run $J_{next}$ without reducing power consumed by one or more jobs.

When sufficient resources are available to run $J_{next}$ (yes at operation 434), a determination is made as to whether the power required to start $J_{next}$ (represented by a portion of the power estimate $P_{next}$) is less than or equal to $P_{freed}$ plus the unallocated power. When $P_{next}$ is greater than $P_{freed}$ plus the unallocated power (no at operation 436), the method 400 returns to operation 435 to determine whether there are additional jobs currently waiting in the queue. When $P_{next}$ is less than or equal to $P_{freed}$ plus the unallocated power (yes at operation 436), the power of one or more jobs is reduced by, at most, $P_{next}$ (operation 437) and subsequently, $J_{next}$ is started when $J_{next}$ a new job or $J_{next}$ is resumed when $J_{next}$ is returns suspended job (operation 438). Upon starting is $J_{next}$ at operation 438, the method 400 returns to operation 401.

The following examples pertain to further embodiments:

A non-transitory computer readable storage medium having stored thereon instructions, the instructions being executable by one or more processors of a distributed computer system to perform operations including determining whether a power consumed by the distributed computer system is greater than a power allocated to the distributed computer system, responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system and responsive to determining all jobs being processed by the distributed computer system are processing at a lowest power state for each job, suspending a job having a lowest priority among all jobs being processed by the distributed computer system.

A non-transitory computer readable storage medium having stored thereon instructions, the instructions being executable by one or more processors of a distributed computer system to perform operations including determining whether a power consumed by the distributed computer system is greater than a power allocated to the distributed computer system, responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system and responsive to determining all jobs being processed by the distributed computer system are processing at a lowest power state for each job, checkpointing the job having a lowest priority among all jobs being processed by the distributed computer system, responsive to checkpointing the job having the lowest priority, suspending a job having a lowest priority among all jobs being processed by the distributed computer system.

A non-transitory computer readable storage medium having stored thereon instructions, the instructions being executable by one or more processors of a distributed computer system to perform operations including determining whether a power consumed by the distributed computer system is greater than a power allocated to the distributed computer system, responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system and responsive to determining all jobs being processed by the distributed computer system are processing at a lowest power state for each job, suspending a job having a lowest priority among all jobs being processed by the distributed computer system, wherein a lowest power state of a first job of all jobs being processed by the distributed computer system differs from a lowest power state of a second job of all jobs being processed by the distributed computer system.

A non-transitory computer readable storage medium having stored thereon instructions, the instructions being executable by one or more processors of a distributed computer system to perform operations including determining whether a power consumed by the distributed computer system is greater than a power allocated to the distributed computer system, responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system, responsive to determining all jobs being processed by the distributed computer system are processing at a lowest power state for each job, suspending a job having a lowest priority among all jobs being processed by the distributed computer system and after suspending the job having the lowest priority among all jobs being processed by the distributed computer system, recalculating the power consumed by the distributed computer system, wherein a lowest power state of a first job of all jobs being processed by the distributed computer system differs from a lowest power state of a second job of all jobs being processed by the distributed computer system.

A non-transitory computer readable storage medium having stored thereon instructions, the instructions being executable by one or more processors of a distributed computer system to perform operations including determining whether a power consumed by the distributed computer system is greater than a power allocated to the distributed computer system, responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system, responsive to determining all jobs being processed by the distributed computer system are processing at a lowest power state for each job, suspending a job having a lowest priority among all jobs being processed by the distributed computer system, after suspending the job having the lowest priority among all jobs being processed by the distributed computer system, recalculating the power consumed by the distributed computer system and after recalculating the power consumed by the distributed computer system, suspending a second job having a second lowest priority, wherein a lowest power state of a first job of all jobs being processed by the distributed computer system differs from a lowest power state of a second job of all jobs being processed by the distributed computer system.

A non-transitory computer readable storage medium having stored thereon instructions, the instructions being executable by one or more processors of a distributed computer system to perform operations including determining whether a power consumed by the distributed computer system is greater than a power allocated to the distributed computer system, responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system, responsive to determining all jobs being processed by the distributed computer system are processing at a lowest power state for each job, suspending a job having a lowest priority among all jobs being processed by the distributed computer system and responsive to suspending the job having the lowest priority among all jobs being processed by the distributed computer system, determining whether the power consumed by the distributed computer system is greater than the power allocated to the system and responsive to determining the power consumed by the distributed computer system is greater than the power allocated to the system, terminating a second job having a second lowest priority.

A non-transitory computer readable storage medium having stored thereon instructions, the instructions being executable by one or more processors to perform operations including determining whether a power consumed by a distributed computer system is less than a power allocated to the distributed computer system, responsive to determining a power consumed by the distributed computer system is less than the power allocated to the distributed computer system, determining whether unallocated resources are available, responsive to determining unallocated resources are available, determining whether sufficient resources for a highest priority job in a job queue are available, wherein a job includes one or more calculations performed by the one or more processors of the distributed computer system, when sufficient resources for a highest priority job in a job queue are available, determining whether a power to process the highest priority job is available and when the power to process the highest priority job is available, starting the highest priority job.

A non-transitory computer readable storage medium having stored thereon instructions, the instructions being executable by one or more processors to perform operations including determining whether a power allocated to a distributed computer system is less than a power consumed by the distributed computer system, responsive to determining the power allocated to the distributed computer system is less than the power consumed by the distributed computer system, determining whether a preference exists to allocate excess power to jobs in the job queue, responsive to determining no preference exists to allocate excess power to jobs in the job queue, determining whether unallocated resources are available, responsive to determining unallocated resources are available, determining whether sufficient resources for a highest priority job in a job queue are available, wherein a job includes one or more calculations performed by the one or more processors of the distributed computer system, when sufficient resources for a highest priority job in a job queue are available, determining whether a power to process the highest priority job is available and when the power to process the highest priority job is available, starting the highest priority job.

A non-transitory computer readable storage medium having stored thereon instructions, the instructions being executable by one or more processors to perform operations including determining whether a power allocated to a distributed computer system is less than a power consumed by the distributed computer system, responsive to determining the power allocated to the distributed computer system is less than the power consumed by the distributed computer system, determining whether a preference exists to allocate excess power to jobs in the job queue, responsive to determining a preference exists to allocate excess power to jobs in the job queue, allocating an excess power to one or more jobs being processed by the distributed computer system.

A non-transitory computer readable storage medium having stored thereon instructions, the instructions being executable by one or more processors to perform operations including determining whether a power allocated to a distributed computer system is less than a power consumed by the distributed computer system, responsive to determining a power allocated to a distributed computer system is less than a power consumed by the distributed computer system, determining whether unallocated resources are available, responsive to determining unallocated resources are available, determining whether sufficient resources for a highest priority job in a job queue are available, wherein a job includes one or more calculations performed by the one or more processors of the distributed computer system, when sufficient resources for a highest priority job in a job queue are available, determining whether a power to process the highest priority job is available and when the power to process the highest priority job is available, starting the highest priority job, wherein determining whether a power to process the highest priority job is available includes determining whether a power required to process the highest priority job is less than the power allocated to the distributed computer system minus the power consumed by the distributed computer system minus a first system guardband.

A non-transitory computer readable storage medium having stored thereon instructions, the instructions being executable by one or more processors to perform operations including determining whether a power allocated to a distributed computer system is less than a power consumed by the distributed computer system, responsive to determining a power allocated to a distributed computer system is less than a power consumed by the distributed computer system, determining whether unallocated resources are available, responsive to determining unallocated resources are available, determining whether sufficient resources for a highest priority job in a job queue are available, wherein a job includes one or more calculations performed by the one or more processors of the distributed computer system, when sufficient resources for a highest priority job in a job queue are available, determining whether a power to process the highest priority job is available, and when the power to process the highest priority job is available, starting the highest priority job, wherein determining whether a power to process the highest priority job is available includes determining whether a power required to process the highest priority job is less than the power allocated to the distributed computer system minus the power consumed by the distributed computer system minus a first system guardband and the first system guardband includes a predefined amount of power not to be allocated to one or more jobs in order to prevent fluctuations in power consumption of the distributed computer system from exceeding the power allocated to the distributed computer system.

A non-transitory computer readable storage medium having stored thereon instructions, the instructions being executable by one or more processors to perform operations including determining whether a power allocated to a distributed computer system is less than a power consumed by the distributed computer system, responsive to determining a power allocated to a distributed computer system is less than a power consumed by the distributed computer system, determining whether unallocated resources are available, responsive to determining unallocated resources are available, determining whether sufficient resources for a highest priority job in a job queue are available, wherein a job includes one or more calculations performed by the one or more processors of the distributed computer system, when sufficient resources for a highest priority job in a job queue are available, determining whether a power to process the highest priority job is available and when the power to process the highest priority job is available, starting the highest priority job, wherein starting the highest priority job includes starting a new job from the job queue.

A non-transitory computer readable storage medium having stored thereon instructions, the instructions being executable by one or more processors to perform operations including determining whether a power allocated to a distributed computer system is less than a power consumed by the distributed computer system, responsive to determining a power allocated to a distributed computer system is less than a power consumed by the distributed computer system, determining whether unallocated resources are available, responsive to determining unallocated resources are available, determining whether sufficient resources for a highest priority job in a job queue are available, wherein a job includes one or more calculations performed by the one or more processors of the distributed computer system, when sufficient resources for a highest priority job in a job queue are available, determining whether a power to process the highest priority job is available and when the power to process the highest priority job is available, starting the highest priority job, wherein starting the highest priority job includes resuming a suspended job in the job queue.

A non-transitory computer readable storage medium having stored thereon instructions, the instructions being executable by one or more processors to perform operations including determining whether a power allocated to a distributed computer system is less than a power consumed by the distributed computer system, responsive to determining a power allocated to a distributed computer system is less than a power consumed by the distributed computer system, determining whether unallocated resources are available, responsive to determining unallocated resources are available, determining whether sufficient resources for a highest priority job in a job queue are available, wherein a job includes one or more calculations performed by the one or more processors of the distributed computer system, when sufficient resources for a highest priority job in a job queue are available, determining whether a power to process the highest priority job is available and when the power to process the highest priority job is available, starting the highest priority job, wherein the job queue is a prioritized queue configured to include one or both of (1) one or more new jobs or (2) one or more suspended jobs.

A non-transitory computer readable storage medium having stored thereon instructions, the instructions being executable by one or more processors of a distributed computer system to perform operations including determining (1) a power allocated to the distributed computer system minus a first system guardband is less than a power consumed by the distributed computer system and (2) the power consumed by the distributed computer system is less than the power allocated to the system plus a second system guardband, calculating a freed power, wherein the freed power is an amount of power that may be made available to allocate to one or more jobs in a job queue by reducing amount of power consumed by one or more jobs being processed by the distributed computer system, wherein a job includes one or more calculations performed by the one or more processors of the distributed computer system, responsive to calculating the freed power, determining whether a power required for a highest priority job in the job queue is less than the freed power plus an unallocated power, wherein the unallocated power is power allocated to the distributed computer system but unallocated to a job being processed by the distributed computer system, responsive to determining the power required for the highest priority job in the job queue is less than the freed power plus the unallocated power, reducing the amount of power consumed by one or more jobs being processed by the distributed computer system and responsive to determining the power required for the highest priority job in the job queue is less than the freed power plus the unallocated power and reducing the amount of power consumed by one or more jobs being processed by the distributed computer system, starting the highest priority job.

A non-transitory computer readable storage medium having stored thereon instructions, the instructions being executable by one or more processors of a distributed computer system to perform operations including determining (1) a power allocated to the distributed computer system minus a first system guardband is less than a power consumed by the distributed computer system and (2) the power consumed by the distributed computer system is less than the power allocated to the system plus a second system guardband, calculating a freed power, wherein the freed power is an amount of power that may be made available to allocate to one or more jobs in a job queue by reducing amount of power consumed by one or more jobs being processed by the distributed computer system, wherein a job includes one or more calculations performed by the one or more processors of the distributed computer system, responsive to calculating the freed power, determining whether a power required for a highest priority job in the job queue is less than the freed power plus an unallocated power, wherein the unallocated power is power allocated to the distributed computer system but unallocated to a job being processed by the distributed computer system, responsive to determining the power required for the highest priority job in the job queue is less than the freed power plus the unallocated power, reducing the amount of power consumed by one or more jobs being processed by the distributed computer system and responsive to determining the power required for the highest priority job in the job queue is less than the freed power plus the unallocated power and reducing the amount of power consumed by one or more jobs being processed by the distributed computer system, starting the highest priority job, wherein starting the highest priority job includes starting a new job from the job queue.

A non-transitory computer readable storage medium having stored thereon instructions, the instructions being executable by one or more processors of a distributed computer system to perform operations including determining (1) a power allocated to the distributed computer system minus a first system guardband is less than a power consumed by the distributed computer system and (2) the power consumed by the distributed computer system is less than the power allocated to the system plus a second system guardband, calculating a freed power, wherein the freed power is an amount of power that may be made available to allocate to one or more jobs in a job queue by reducing amount of power consumed by one or more jobs being processed by the distributed computer system, wherein a job includes one or more calculations performed by the one or more processors of the distributed computer system, responsive to calculating the freed power, determining whether a power required for a highest priority job in the job queue is less than the freed power plus an unallocated power, wherein the unallocated power is power allocated to the distributed computer system but unallocated to a job being processed by the distributed computer system, responsive to determining the power required for the highest priority job in the job queue is less than the freed power plus the unallocated power, reducing the amount of power consumed by one or more jobs being processed by the distributed computer system and responsive to determining the power required for the highest priority job in the job queue is less than the freed power plus the unallocated power and reducing the amount of power consumed by one or more jobs being processed by the distributed computer system, starting the highest priority job, wherein starting the highest priority job includes resuming a suspended job in the job queue.

A non-transitory computer readable storage medium having stored thereon instructions, the instructions being executable by one or more processors of a distributed computer system to perform operations including determining (1) a power allocated to the distributed computer system minus a first system guardband is less than a power consumed by the distributed computer system and (2) the power consumed by the distributed computer system is less than the power allocated to the system plus a second system guardband, calculating a freed power, wherein the freed power is an amount of power that may be made available to allocate to one or more jobs in a job queue by reducing amount of power consumed by one or more jobs being processed by the distributed computer system, wherein a job includes one or more calculations performed by the one or more processors of the distributed computer system, after calculating the freed power, generating a power estimate for the highest priority job, responsive to calculating the power estimate, determining whether a power required for a highest priority job in the job queue is less than the freed power plus an unallocated power, wherein the unallocated power is power allocated to the distributed computer system but unallocated to a job being processed by the distributed computer system, responsive to determining the power required for the highest priority job in the job queue is less than the freed power plus the unallocated power, reducing the amount of power consumed by one or more jobs being processed by the distributed computer system and responsive to determining the power required for the highest priority job in the job queue is less than the freed power plus the unallocated power and reducing the amount of power consumed by one or more jobs being processed by the distributed computer system, starting the highest priority job.

A non-transitory computer readable storage medium having stored thereon instructions, the instructions being executable by one or more processors of a distributed computer system to perform operations including determining (1) a power allocated to the distributed computer system minus a first system guardband is less than a power consumed by the distributed computer system and (2) the power consumed by the distributed computer system is less than the power allocated to the system plus a second system guardband, calculating a freed power, wherein the freed power is an amount of power that may be made available to allocate to one or more jobs in a job queue by reducing amount of power consumed by one or more jobs being processed by the distributed computer system, wherein a job includes one or more calculations performed by the one or more processors of the distributed computer system, responsive to calculating the freed power, determining whether a power required for a highest priority job in the job queue is less than the freed power plus an unallocated power, wherein the unallocated power is power allocated to the distributed computer system but unallocated to a job being processed by the distributed computer system, responsive to determining the power required for the highest priority job in the job queue is less than the freed power plus the unallocated power, reducing the amount of power consumed by one or more jobs being processed by the distributed computer system and responsive to determining the power required for the highest priority job in the job queue is less than the freed power plus the unallocated power and reducing the amount of power consumed by one or more jobs being processed by the distributed computer system, starting the highest priority job, when sufficient resources are not available to process the highest priority job and sufficient resources are available to process a second highest priority job, starting the second highest priority job.

A non-transitory computer readable storage medium having stored thereon instructions, the instructions being executable by one or more processors of a distributed computer system to perform operations including determining (1) a power allocated to the distributed computer system minus a first system guardband is less than a power consumed by the distributed computer system and (2) the power consumed by the distributed computer system is less than the power allocated to the system plus a second system guardband, calculating a freed power, wherein the freed power is an amount of power that may be made available to allocate to one or more jobs in a job queue by reducing amount of power consumed by one or more jobs being processed by the distributed computer system, wherein a job includes one or more calculations performed by the one or more processors of the distributed computer system, responsive to calculating the freed power, determining whether a power required for a highest priority job in the job queue is less than the freed power plus an unallocated power, wherein the unallocated power is power allocated to the distributed computer system but unallocated to a job being processed by the distributed computer system, responsive to determining the power required for the highest priority job in the job queue is less than the freed power plus the unallocated power, reducing the amount of power consumed by one or more jobs being processed by the distributed computer system and responsive to determining the power required for the highest priority job in the job queue is less than the freed power plus the unallocated power and reducing the amount of power consumed by one or more jobs being processed by the distributed computer system, starting the highest priority job, when the power required for the highest priority job is greater than the freed power plus the unallocated power and a power required for a second highest priority job is less than the freed power plus the unallocated power, starting the second highest priority job.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium, which is not a signal bearing medium, having stored thereon instructions, the instructions being executable by one or more processors of a distributed computer system to perform operations including:
    determining whether a power consumed by the distributed computer system is greater than a power allocated to the distributed computer system;
    responsive to determining the power consumed by the distributed computer system is greater than the power allocated to the distributed computer system, determining whether all jobs being processed by the distributed computer system are processing at a lowest power state for each job, wherein a job includes one or more calculations performed by the one or more processors of the distributed computer system, and wherein each job includes a user power policy set forth by a job owner, wherein the user power policy for each job includes a parameter that indicates a minimum amount of power at which each job can run, wherein each job's lowest power state is constrained by the user power policy for that job and wherein the user power policy indicates whether the job is suspendable; and
    responsive to determining all jobs being processed by the distributed computer system are processing at a lowest power state for each job,
    identifying, among all jobs being processed by the distributed computer system, one or more jobs that are suspendable based on the policy;
    suspending, starting with a lowest priority, the one or more jobs that the user policy indicates as suspendable; and
    allocating, to currently running jobs, excess power obtained as a result of suspending the one or more jobs, with allocation being done equally, proportionally or according to job priority.

2. The non-transitory computer readable storage medium of claim 1, further comprising:
    prior to suspending the job having the lowest priority among all jobs being processed by the distributed computer system and responsive to determining all jobs being processed by the distributed computer system are processing at the lowest power state for each job, checkpointing the job having a lowest priority among all jobs being processed by the distributed computer system.

3. The non-transitory computer readable storage medium of claim 1, wherein a lowest power state of a first job of all jobs being processed by the distributed computer system differs from a lowest power state of a second job of all jobs being processed by the distributed computer system.

4. The non-transitory computer readable storage medium of claim 3, further comprising:
after suspending the job having the lowest priority among all jobs being processed by the distributed computer system, recalculating the power consumed by the distributed computer system.

5. The non-transitory computer readable storage medium of claim 4, further comprising:
after recalculating the power consumed by the distributed computer system, suspending a second job having a second lowest priority.

6. The non-transitory computer readable storage medium of claim 1, further comprising:
responsive to suspending the job having the lowest priority among all jobs being processed by the distributed computer system, determining whether the power consumed by the distributed computer system is greater than the power allocated to the system; and
responsive to determining the power consumed by the distributed computer system is greater than the power allocated to the system, terminating a second job having a second lowest priority.

7. The non-transitory computer-readable storage medium defined in claim 1, wherein the power policy for each job includes one or more parameters that indicate at least one of:
a maximum amount of power at which each job can run,
a minimum frequency at which the one or more processors processing each job can operate,
a maximum frequency at which the one or more processors processing each job can operate, or
whether for each job can be subjected to a power limit.

8. A method comprising:
determining whether a power consumed by a distributed computer system is greater than a power allocated to the distributed computer system;
responsive to determining the power consumed by the distributed computer system is greater than the power allocated to the distributed computer system, determining whether all jobs being processed by the distributed computer system are processing at a lowest power state for each job, wherein a job includes one or more calculations performed by one or more processors of the distributed computer system, and wherein each job includes a user power policy set forth by a job owner, wherein the user power policy for each job includes a parameter that indicates a minimum amount of power at which each job can run, wherein each job's lowest power state is constrained by the user power policy for that job and wherein the user power policy indicates whether the job is suspendable; and
responsive to determining all jobs being processed by the distributed computer system are processing at a lowest power state for each job,
identifying, among all jobs being processed by the distributed computer system, one or more jobs that are suspendable based on the policy;
suspending, starting with a lowest priority, the one or more jobs that the user policy indicates as suspendable; and
allocating, to currently running jobs, excess power obtained as a result of suspending the one or more jobs, with allocation being done equally, proportionally or according to job priority.

9. The method defined in claim 8, further comprising:
prior to suspending the job having the lowest priority among all jobs being processed by the distributed computer system and responsive to determining all jobs being processed by the distributed computer system are processing at the lowest power state for each job, checkpointing the job having a lowest priority among all jobs being processed by the distributed computer system.

10. The method defined in claim 8, wherein a lowest power state of a first job of all jobs being processed by the distributed computer system differs from a lowest power state of a second job of all jobs being processed by the distributed computer system.

11. The method defined in claim 10, further comprising:
after suspending the job having the lowest priority among all jobs being processed by the distributed computer system, recalculating the power consumed by the distributed computer system.

12. The method defined claim 11 further comprising:
after recalculating the power consumed by the distributed computer system, suspending a second job having a second lowest priority.

13. The method defined claim 8, further comprising:
responsive to suspending the job having the lowest priority among all jobs being processed by the distributed computer system, determining whether the power consumed by the distributed computer system is greater than the power allocated to the system; and
responsive to determining the power consumed by the distributed computer system is greater than the power allocated to the system, terminating a second job having a second lowest priority.

14. The method defined in claim 8, wherein the power policy for each job includes one or more parameters that indicate at least one of:
a maximum amount of power at which each job can run,
a minimum frequency at which the one or more processors processing each job can operate,
a maximum frequency at which the one or more processors processing each job can operate, or
whether for each job can be subjected to a power limit.

* * * * *